United States Patent
Raju et al.

(10) Patent No.: US 10,061,863 B2
(45) Date of Patent: Aug. 28, 2018

(54) ASSET MANAGER

(75) Inventors: Satya S. Raju, Flower Mound, TX (US); Mohammad Reza Shafiee, Ridgefield, CT (US); Arunanand Addepalli, Irving, TX (US); Michael J. Naggar, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 857 days.

(21) Appl. No.: 12/971,073

(22) Filed: Dec. 17, 2010

(65) Prior Publication Data

US 2012/0158667 A1 Jun. 21, 2012

(51) Int. Cl.
*G06F 17/00* (2006.01)
*G06F 17/30* (2006.01)

(52) U.S. Cl.
CPC .............. *G06F 17/30914* (2013.01)

(58) Field of Classification Search
USPC ................................. 707/756, 687
See application file for complete search history.

(56) References Cited

U.S. PATENT DOCUMENTS

| | | | | |
|---|---|---|---|---|
| 7,277,870 B2* | 10/2007 | Mourad | ............. | G06F 17/3089 380/200 |
| 8,042,132 B2* | 10/2011 | Carney et al. | ................... | 725/37 |
| 2002/0107973 A1* | 8/2002 | Lennon | ............. | G06F 17/30905 709/231 |
| 2004/0136698 A1* | 7/2004 | Mock | ............................ | 386/123 |
| 2005/0278375 A1* | 12/2005 | Mitchko | ............ | G06F 17/30817 |
| 2006/0161635 A1* | 7/2006 | Lamkin | ............. | G06F 17/30041 709/217 |
| 2006/0174310 A1* | 8/2006 | Lee | ........................ | H04H 60/65 725/135 |
| 2007/0016530 A1* | 1/2007 | Stasi | .................. | G06Q 10/0637 705/52 |
| 2007/0083899 A1* | 4/2007 | Compton et al. | ................ | 725/87 |
| 2007/0174852 A1* | 7/2007 | Smirnov et al. | ............... | 719/328 |
| 2008/0071806 A1* | 3/2008 | Gaurav et al. | ................ | 707/100 |
| 2009/0178089 A1* | 7/2009 | Picco et al. | ..................... | 725/87 |
| 2010/0235333 A1* | 9/2010 | Bates et al. | .................... | 707/692 |
| 2010/0318672 A1* | 12/2010 | Bouazizi | ............. | H04L 67/2823 709/231 |
| 2011/0004897 A1* | 1/2011 | Alexander et al. | ............. | 725/32 |
| 2011/0107379 A1* | 5/2011 | Lajoie et al. | ................... | 725/87 |

\* cited by examiner

*Primary Examiner* — Mohsen Almani

(57) ABSTRACT

A method may include automatically receiving content and metadata; automatically identifying a source metadata format of the metadata; automatically identifying a target metadata format; automatically selecting a data map to perform validation of the metadata and at least one of transforming or translating of the metadata based on the identifying of the source metadata format and the identifying of the target metadata format, wherein the transforming includes converting the metadata to the target metadata format and the translating includes converting a file type of the metadata to a target metadata file type; and automatically attempting to validate the metadata based on the data map; automatically performing the at least one of the transforming or the translating of a validated metadata when the metadata is validated based on the data map, wherein the transforming includes converting the validated metadata to the target metadata format including one or more extendible fields.

20 Claims, 15 Drawing Sheets

ASSET MANAGER

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION

Figure 1:
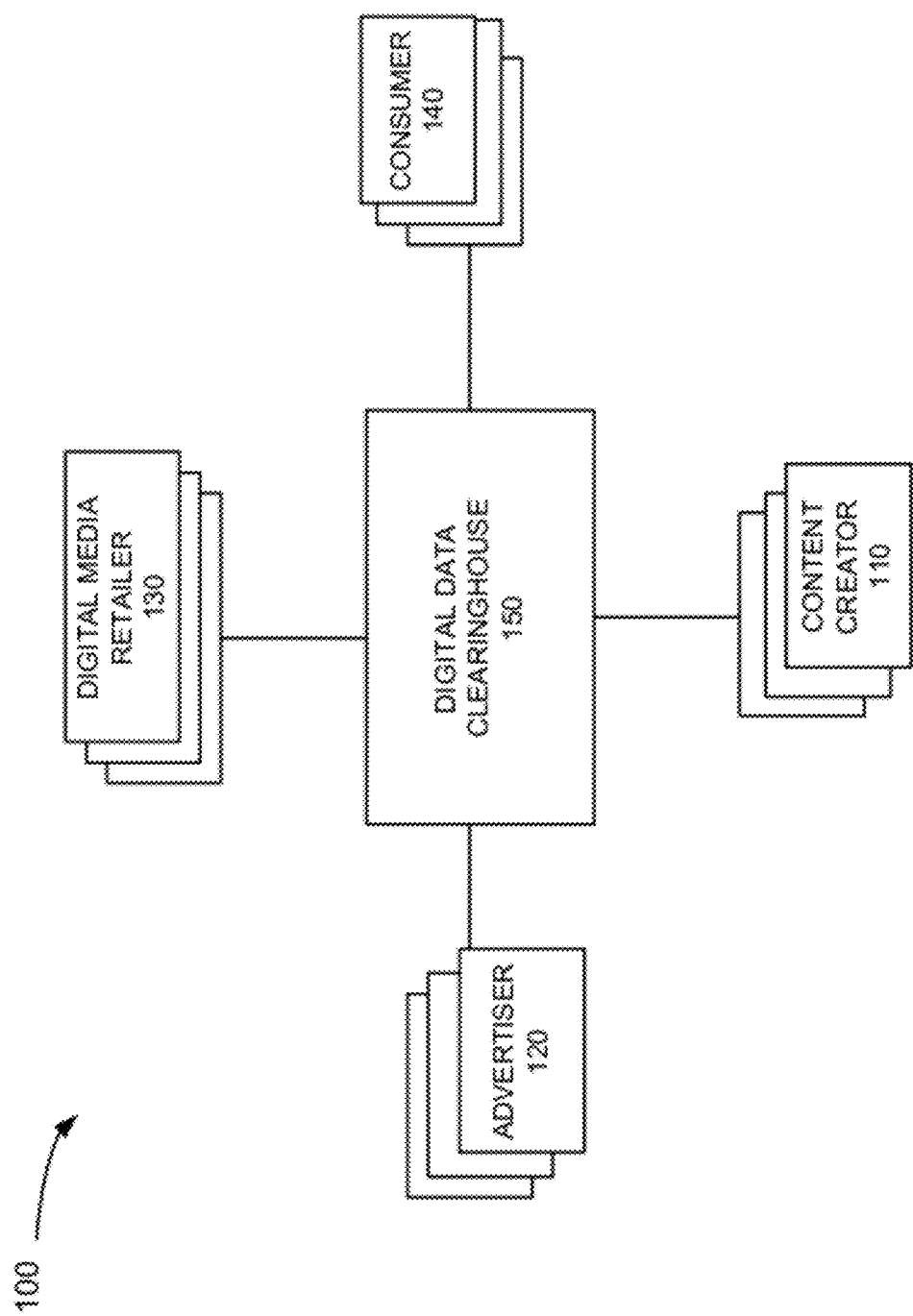
FIG. 1 is a diagram illustrating an exemplary network that includes a digital distribution clearinghouse (DDC) for processing content.

The following detailed description refers to the accompanying drawings. The same reference numbers in different drawings may identify the same or similar elements.

As described herein, a digital data clearinghouse (DDC) may permit a user (e.g., a DDC user, etc.) to define or create work units, use these work units to compose a work flow and, to dynamically provide for customer-requested processes for asset distribution. When the user submits a service order for processing content on behalf of a customer, the DDC may obtain, from the work flow associated with a work order, work unit tasks that correspond to the work units. The DDC may perform all or some of these tasks.

The term "content," as used herein, may include for example, multimedia content (e.g., text-based content, audio content, and video content, such as a movie, a show, a television program, a preview, a broadcast of a live event (e.g., a sporting event, a concert, etc.)), or another type of content (e.g., print media, an image, a poster, a box cover, etc.). The term "asset," as used herein, may include, for example, content and metadata. The term "metadata," as used herein, may include, for example, data or information (e.g., descriptive data, data indicating how content is to be displayed, copied, sold, etc.) pertaining to content. Content and metadata may be grouped as various entities. For example, a group of content and metadata may be considered a package or a group of packages may be considered a bundle.

The term "work unit," as used herein, may refer to a description of a set of one or more operations that the DDC may perform pertaining to the ingestion, transforming, and distribution of assets. For example, the transforming of an asset may include overlaying subtitles on a video, inserting advertisements into a video, transcoding content from one format to another format, etc. A further description of a work unit is provided below.

The term "work flow," as used herein, may refer to one or more work units that may be executed to fulfill a work flow task associated with a work order. For example, a work unit may include an input and an output to permit a series of work units to form a processing path through which content may flow.

The term "work order," as used herein, may refer to an order (e.g., associated with a customer) that is received for processing by the DDC. A work order may include a work flow, criteria for the selection of the content to be processed in the work flow, and the parameter values for the work units pertaining to the work flow. For example, the parameters may include system parameters that may not be changeable, default parameters that may be changeable, and default parameters that may require human intervention (e.g., user verification, user entry, etc.).

The term "work unit task," as used herein, may refer to particular function or operation that may be performed based on a work unit. A work unit may perform one or more work unit tasks.

According to an exemplary scenario, assume that a user defines two work units via the DDC. Also assume that the first work unit describes reformatting an M×N video into a 600×400 video, and the second work unit describes inserting an advertisement into the video. When a customer (e.g., a content creator, a content provider, etc.) places an order with the user to reformat the video into a 600×400 video and insert an advertisement in the video, the user may compose, through a graphical user interface (e.g., GUI) provided via the DDC, a work flow by concatenating two or more work units. When the user submits a work order, the DDC may schedule for execution a set of tasks that are associated with the work units included in the work flow. The DDC may then perform the tasks. The preceding example is provided for simplicity. Descriptions below provide additional details with respect to the DDC. In particular, an asset manager will be described further below.

FIG. 1 is a diagram of an exemplary network 100 that includes a DDC for processing assets. Referring to FIG. 1, network 100 includes one or more content creators 110, one or more advertisers 120, one or more digital media retailers (DMRs) 130, one or more consumers 140 and digital data clearinghouse (DDC) 150.

Content creator 110 (referred to collectively as content creators 110 or individually as content creator 110) may represent one or more creators of assets that wish to package and/or distribute the assets to other parties, such as consumers 140. For example, content creators 110 may include movie or television studios, music companies, publishers, game developers, parties who generate user-generated content (UGC), websites, blog sites, etc. Content creators 110 may provide content to DDC 150 for transforming (e.g., transcoding, formatting, etc.), packaging and/or distribution, as described further below.

Advertiser 120 (referred to collectively as advertisers 120 or individually as advertiser 120) may represent one or more parties that wish to insert advertising into content. For example, advertiser 120 may contract with a content creator 110 and/or digital media retailer 130 to insert an advertisement into a media stream provided to consumers 140. DDC 150 may insert the advertisement into the media stream in accordance with the agreement between the parties.

DMR 130 may represent one or more business entities that receive assets from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive assets from DDC 150 and sell/provide the assets to consumers 140.

Consumer 140 may represent one or more consumers 140 that receive assets originally generated by or provided by content creators 110 and that has been processed by DDC 150. For example, DDC 150 may format and package the assets for distribution by DMRs 130 and/or DDC 150 to consumers 140.

DDC 150 may include one or more devices (e.g., a server device, a computing device, etc.) for processing assets. For example, as described above, DDC 150 may provide an automated environment in which assets from content creators 110 are transformed and packaged for distribution in any number of formats, based on the particular requirements associated with DMRs 130. According to an exemplary embodiment, DDC 150 may also aggregate various data and insert advertisements into the content. DDC 150, consistent with embodiments described herein, may also utilize flexible work flows to streamline the formatting and packaging of assets for digital distribution.

According to other embodiments, network 100 may include additional devices, fewer devices, different devices, and/or a different configuration than those illustrated in FIG. 1. For example, network 100 may include a large number (e.g., hundreds or thousands) of different types of user device associated with consumers 140, such as a mobile device, a stationary device, a handheld device, or a portable device. For example, the user device may include a television, a cellular phone, a computer (e.g., laptop, desktop, tablet, notebook, netbook, etc.), a personal digital assistant (PDA), a gaming device, a location-aware device, an Internet accessible device, etc. Additionally, or alternatively, according to other exemplary embodiments, network 100 may include additional DDCs 150, etc. Additionally, or alternatively, network 100 may include one or more networks of various types to interconnect the devices illustrated in FIG. 1 and enable the devices to communicate with one another. For example, network 100 may include a public switched telephone network (PSTN), a local area network (LAN), a wide area network (WAN), the Internet, an intranet, or some other type of network. Network 110 may include wireless connections and/or wireless connections among the devices illustrated.

Also, according to other embodiments, one or more functions and/or processes described as being performed by a particular device or component may be performed by a different device or component, or some combination of devices or components. Additionally, or alternatively, according to other embodiments, one or more functions and/or processes described as being performed by multiple devices or multiple components may be performed by different devices or components, or a single device, etc.

Figure 2:
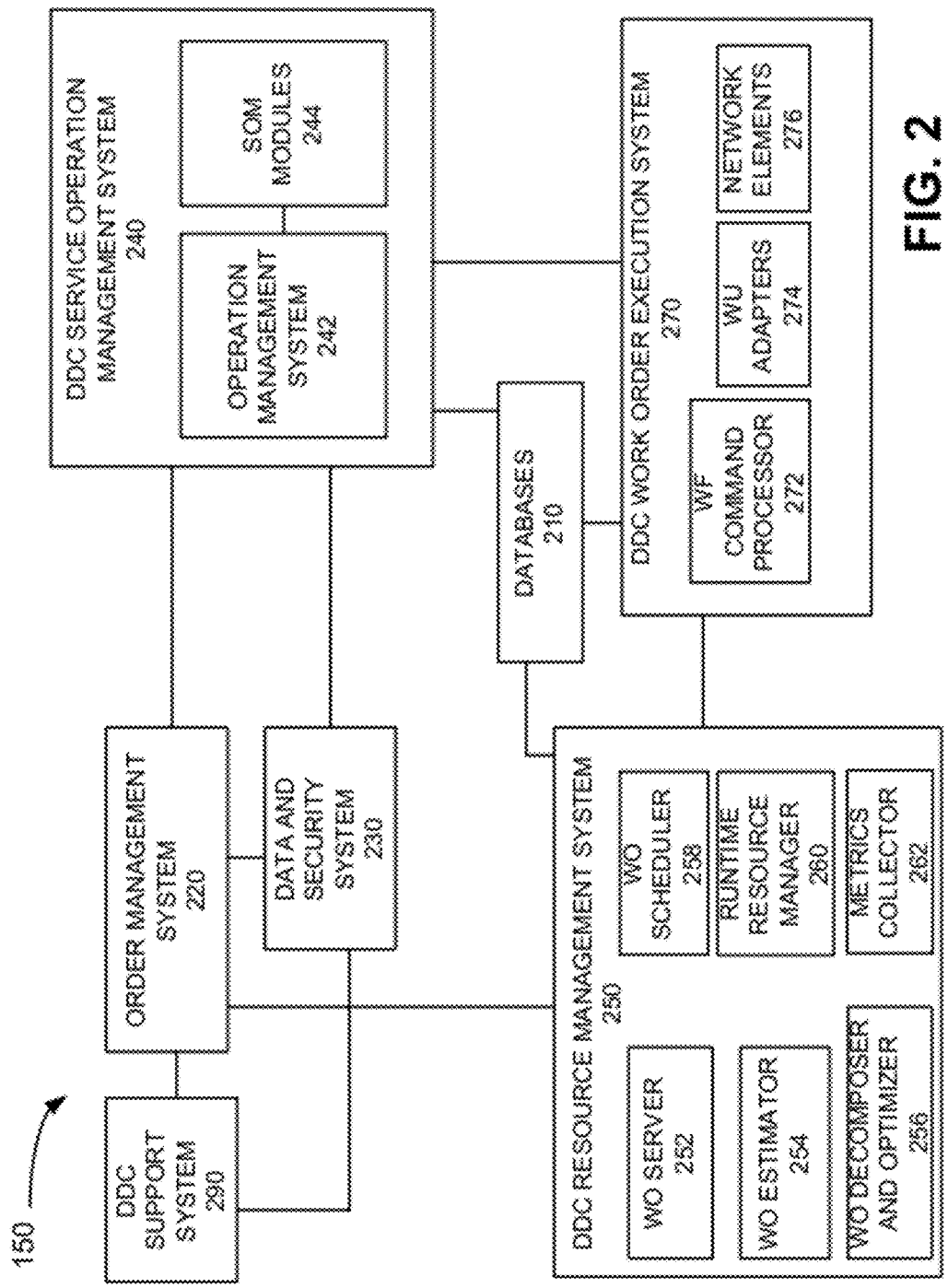
FIG. 2 is a diagram illustrating an exemplary embodiment of the DDC illustrated in FIG. 1.

FIG. 2 illustrates an exemplary embodiment of DDC 150. Referring to FIG. 2, DDC 150 may include databases 210, order management system 220, data and security system 230, DDC service operation management system 240, DDC resource management system 250, DDC work order execution system 270, and DDC support system 290.

Databases 210 may store work unit definitions, work flows, parameters, tables, etc., that are associated with various devices, components, etc., in DDC 150, intermediate or end results of processing performed by different processes in DDC 150, etc.

Order management system 220 may include one or more devices (e.g., a server device, a computing device, etc.) for managing customer orders, generating reports, etc. According to an exemplary embodiment, order management system 220 may include client components that interface with components of DDC service operation management system 240. The client components (e.g., web browser) may receive customer orders, requests for reports, etc., and relay the received information to the components of DDC service operation management system 240 for the creation, validation, estimation, submission, approval, execution and reporting of activities associated with the customer orders, request for reports, etc. For example, a customer order may be completed by sending, to a component of DDC service operation management system 240, a selection of a particular work flow that will drive the processing of assets associated with the order.

Data and security system 230 may include one or more devices (e.g., a server device, a computing device, etc.) to provide for authentication and authorization of users having roles in DDC 150 and/or for taking actions that are associated with the authorized roles (e.g., create user accounts, remove user accounts, generate an initial password, etc.). For example, when a user logs in as a DDC user, the user may be authorized to design work units and/or compose work flows. According to an exemplary embodiment, data and security system 230 may interface with order management system 220, DDC service operation management system 240, and DDC support system 290.

DDC service operation management system 240 may include one or more devices (e.g., a server device, a computing device, etc.) to control an overall operation, configuration, and management of DDC 150. For example, DDC service operation management system 240 may include operation management system 242 and service operation management modules 244. Via a client component that communicates with operation management system 242, a user may control the configuration, administration and operation of DDC 150. For example, in one implementation, via a web browser or another client application, a user may control security, compose a work flow, administer accounts that are associated with content creator 110 or DMR 130, submit a work order, add data to storage of DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ service operation management (SOM) modules 244. SOM modules 244 may include components that correspond to the above-listed services. For example, SOM modules 244 may include a security manager, a work flow manager, an account manager, a work order manager, a data and storage manager, a resource management module, a configuration manager, an asset management module, a catalog management module, a monitoring and reporting module, etc. DDC service operation management system 240 may further include GUIs for interfacing with service operation management (SOM) modules 244.

DDC resource management system 250 may include one or more devices (e.g., a server device, a computing device, etc.) that support the capacity management of resources associated with network elements (NEs) of DDC 150. As illustrated in FIG. 2, DDC resource management system 250 may include a work order server 252, a work order estimator 254, a work order decomposer and optimizer 256, a work order scheduler 258, a runtime resource manager 260, and a metrics collector 262.

Work order server 252 may provide work order-related interfaces to operation management system 242 and/or SOM modules 244, and may communicate with work order estimator 254, work order decomposer and optimizer 256, and work order scheduler 258 to submit, decompose, validate, and save work orders, and to estimate, schedule, and reserve resources during an order submission.

Work order estimator 254 may estimate the cost of completing a decomposed work order across work units of a work flow, based on resources that are associated with the work units for each resource type. Work order estimator 254 may store the cost in one of databases 210 in terms of resource capacity units (RCUs) and duration of time required to complete work unit tasks, sub-work unit tasks, processes, etc., which may pertain to the execution of the work order. The term "RCU", as used herein, may include a unit of measure for a resource type. For example, an RCU may correspond to bits per second, tasks per hour, central processing unit (CPU) processing time, etc., or some other type of quantity of unit (e.g., capacity unit) by time (e.g., a time unit, such as, hour, minute, second, millisecond, etc.), quantity of unit (e.g., gigabyte (GB) for storage, megabits for bandwidth, etc), etc.

Work order decomposer and optimizer 256 may break down an order into work units based on the work flow associated with the order. Furthermore, based on the decomposition, work order decomposer and optimizer 256 may generate work unit tasks, or simply "tasks," assign work unit task parameters, create work unit task connectors, etc., which are described further below.

Work order scheduler 258 may match cost estimates for different resource types for a work order to available time slots in an allocation schedule across different network elements (e.g., hardware/software components that perform underlying operations for a work unit). As a result of the scheduling, work order scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular content, asset, etc.

DDC work order execution system 270 may include one or more devices (e.g., a server device, a computing device, etc.) to manage the flow and execution of work units of a defined work flow associated with a work order. DDC work order execution system 270 may include a work flow command processor 272, work unit adapters 274, and network elements 276. For simplicity, FIG. 2 does not illustrate other components of DDC work order execution system 270. For example, DDC work order execution system 270 may include a work unit processor (not illustrated). Depending on the implementation, DDC work order execution system 270 may include additional, fewer, or different components than those illustrated in FIG. 2.

Work flow command processor 272 may drive work order execution. According to an exemplary embodiment, work flow command processor 272 may include a work order manager, a work order processor, and a work unit processor (not illustrated). The work order manager may provide interfaces to resource management system 250 for initiating an execution of a work order, retrieving the status of the work order, suspending/resuming the work order execution, canceling the work order, etc. The work order processor may coordinate work unit tasks for completion of a work order. In coordinating different work unit tasks, the work order processor may sequence the tasks for optimum execution time and resource utilization. The work order processor may communicate with runtime resource manager 260 for allocation and de-allocation of resources. The work unit processor may dispatch processes/threads to perform a work unit task.

Work unit adapter 274 may include interfaces for adapting network elements to perform content, metadata, asset processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for ingesting, transforming, and distributing content, metadata, assets, etc.

DDC support system 290 may include one or more devices (e.g., a server device, a computing device, etc.) and/or personnel to provide support services, such as creation of work units, composition of work flows, etc., billing support, contracting management, pricing, etc.

According to other exemplary embodiments, DDC 150 may include additional, fewer, different, and/or a different arrangement of devices than those illustrated in FIG. 2. The configuration shown in FIG. 2 is for illustrative purposes. In other configurations and/or implementations, functions that are associated with one component illustrated in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2. For example, according to an exemplary embodiment, DDC resource management system 250 may include a component for providing reports on resources, schedules, metrics, etc.

Figure 3:
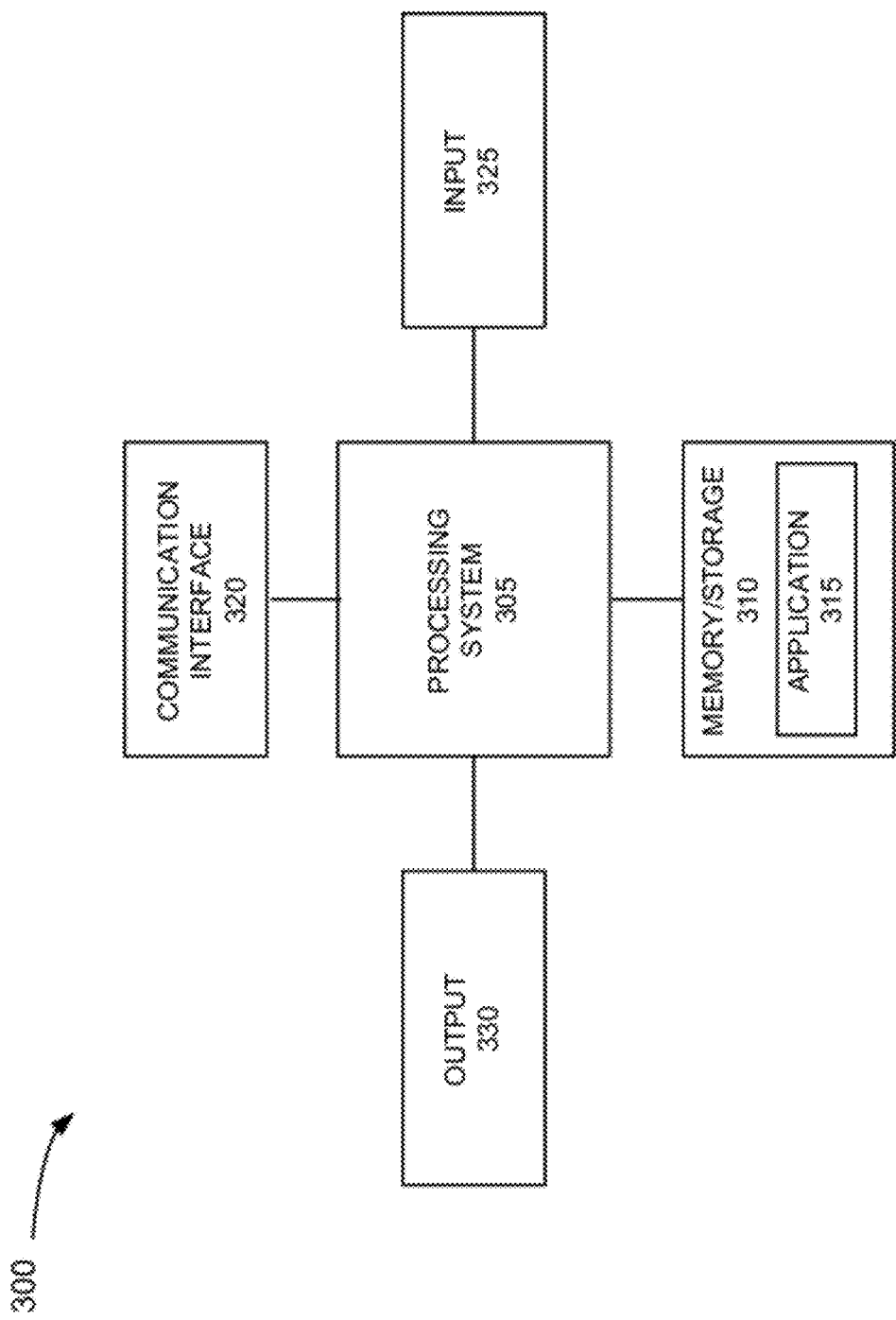
FIG. 3 is a diagram illustrating exemplary components of an exemplary embodiment of one or more devices illustrated in FIG. 2.

FIG. 3 is a diagram illustrating exemplary components of a device 300 that may correspond to one or more of the devices in network 100. For example, device 300 may correspond to one or more devices pertaining to DDC 150, such as, databases 210, order management system 220, data and security system 230, DDC service operation management system 240, DDC resource management system 250, DDC work order execution system 270, and DDC support system 290, as well as correspond to one or more devices pertaining to content creator 110, advertiser 120, digital media retailer 130, and/or consumer 140.

As illustrated, according to an exemplary embodiment, device 300 may include a processing system 305, memory/storage 310 including an application 315, a communication interface 320, an input 325, and an output 330. According to other embodiments, device 300 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 305 may control the overall operation or a portion of operation(s) performed by device 300. Processing system 305 may perform one or multiple operations based on an operating system and/or various applications (e.g., application 315). Processing system 305 may access instructions from memory/storage 310, from other components of device 300, and/or from a source external to device 300 (e.g., a network, another device, etc.).

Memory/storage 310 may include one or multiple memories and/or one or multiple other types of storage devices. For example, memory/storage 310 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 310 may include a hard disk (e.g., a magnetic disk, an optical disk, a magneto-optic disk, a solid state disk, etc.) or some other type of storing medium, along with a corresponding drive. Memory/storage 310 may be external to and/or removable from device 300, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 310 may store data, application(s), and/or instructions related to the operation of device 300.

Application 315 may include software that provides various services and/or functions. For example, with reference to devices, components, etc., of DDC 150, application 315 may include one or multiple applications for performing processes, functions, operations, etc., that are described herein.

Communication interface 320 may permit device 300 to communicate with other devices, networks, systems, etc., illustrated in network 100. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 330 may permit an output from device 300. For example, output 330 may include a speaker, a display, a light, an output port, and/or some other type of visual, auditory, tactile, etc., output component.

As described herein, device 300 may perform processes in response to processing system 305 executing software instructions (e.g., application 315) stored by memory/storage 310. By way of example, the software instructions may be read into memory/storage 310 from another memory/storage 310 or from another device via communication interface 320. The software instructions stored by memory/storage 310 may cause processing system 305 to perform one or more processes described herein. Alternatively, for example, according to other implementations, device 300 may perform one or more processes described herein based on the execution of hardware (processing system 305, etc.), the execution of hardware and firmware, or the execution of hardware, software, and firmware.

Referring to FIG. 2, as previously described, DDC 150 may include, among other devices, DDC service operation management system 240. Further, as previously described, according to an exemplary embodiment, DDC service operation management system 240 may include operation management system 242 and SOM modules 244. A further description of SOM modules 244 is provided below.

Figure 4:
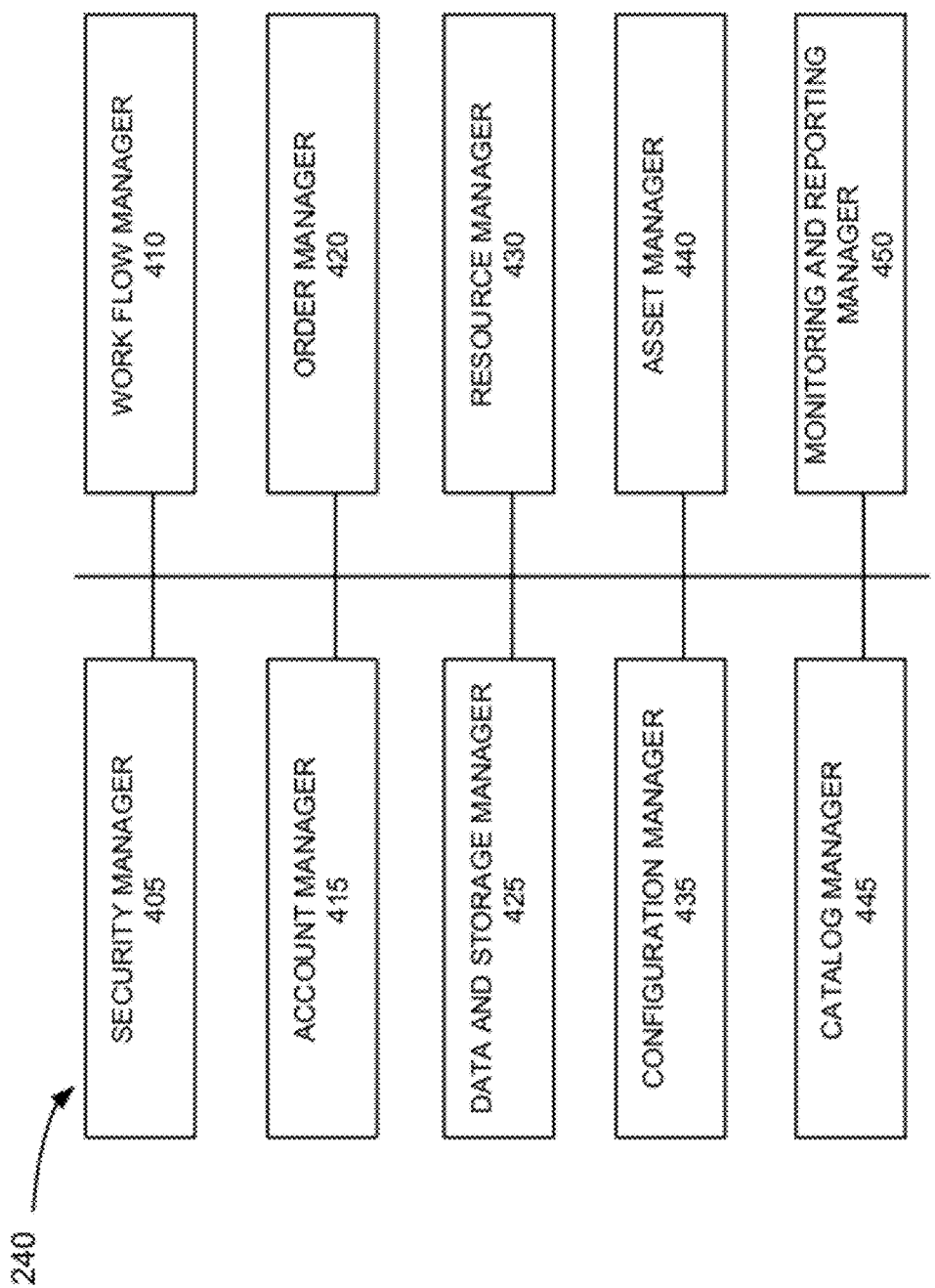
FIG. 4 is a diagram illustrating exemplary components of an exemplary embodiment of the DDC service operation management system.

FIG. 4 is a diagram illustrating components of an exemplary embodiment of SOM modules 244. SOM modules 244 may provide various services to allow a user to control the configuration, administration, and day-to-day operations of DDC 150. As illustrated, SOM modules 240 may include a security manager 405, a work flow manager 410, an account manager 415, an order manager 420, a data and storage manager 425, a resource manager 430, a configuration manager 435, an asset manager 440, a catalog manager 445, and a monitoring and reporting manager 450. According to an exemplary embodiment, SOM modules 244 may include a user interface (e.g., a graphical user interface (GUI)) to allow a DDC user to use SOM modules 240.

Security manager 405 may audit user activity and generate alarms, notifications, etc., in response to security violations. For example, security manager 405 may manage various firewall parameters (e.g., an access control list, etc.), virus protection parameters, storage access parameters (e.g., a network attached storage (NAS) directory access list, etc.), server access parameters (e.g., a server IP address lockdown list, etc.), logins, and/or device configuration parameters (e.g., configuration of servers, etc.).

Work flow manager 410 may manage work flows and sub-work flows pertaining to the processing of a customer order. For example, work flow manager 410 may control a work flow list in which, among other things, the status (e.g., test, active, inactive, etc.) of each work flow may be managed. Work flow manager 410 may also permit the creating of a work flow (e.g., based on an existing work flow, work unit preset parameters, etc.) and the editing of a work flow.

Account manager 415 may manage accounts pertaining to content creators 110 and DMRs 130. Order manager 420 may provide for the creation, validation, estimation, submission, approval, execution, and reporting of activities pertaining to customer orders.

Data and storage manager 425 may manage the storing of metadata, content, assets, and parameters that may be used to archive and purge assets, etc. According to an exemplary embodiment, data and storage manager 425 may divide storage into a working storage area and an archiving storage area. Data and storage manager 425 may monitor storage locations and generate notices pertaining to various occurrences (e.g., low storage space, failures, read/write errors, etc.). Data and storage manager 425 may allow content tagging and library filing of content, assets, etc.

Resource manager 430 may manage the capacity provided by network elements 276 based on resource type. For example, a resource type may correspond to storage, processing, bandwidth, etc. Resource types may be associated with work units. For example, a work unit may need particular resource types, as well as, a particular number of resource capacity units to execute the work unit.

Configuration manager 435 may provide for the initial set-up, configuration, and management of devices, components, etc., of DDC 150. Configuration manager 435 may allow a DDC user to perform various configuration operations, such as, for example, install, roll-back, update, create network element 276, change network element 276 state, etc.

Asset manager 440 may provide for the management of assets. For example, assets may be ingested (e.g., received, processed, etc.) and then archived, or ingested, transformed, packaged and/or distributed. According to exemplary embodiments, when asset manager 440 may receive content and metadata from various sources (e.g., content creator 110, advertiser 120, etc.) asset manager 440 may transform the metadata from one format to another format. By way of example, the metadata may be in an Asset Distribution Interface (ADI) format (e.g., ADI 1.0, ADI 1.1, ADI 2.0, etc.), a FILM format (e.g., FILM 2.0, FILM 3.0), a proprietary format, a nonstandard format, etc. Asset manager 440 may transform the metadata into another format used by DDC 150. According to an exemplary embodiment, the transformed metadata may correspond to an extendible DDC normalized format. For example, the extendible DDC normalized format may be based on an ADI format (e.g., ADI 1.0, ADI 1.1, ADI 2.0, etc.). Asset manager 440 may also transform metadata from the extendible DDC normalized format to another format used by, for example, DMRs 130.

According to an exemplary embodiment, asset manager 440 may keep track of the versions associated with the transformed metadata. For example, a version of the metadata originating from a source (e.g., content creator 110, etc.) may be considered the parent version, and any transformations of the metadata thereafter may be considered a child version. Also, a child version may be considered a parent version to another child version. Asset manager 440 may also keep track of the versions associated with content, assets, packages, bundles, etc., in a similar manner.

According to an exemplary embodiment, asset manager 440 may validate the metadata. For example, asset manager 440 may validate fields, values, etc., associated with the metadata when metadata is ingested, distributed, etc. Asset manager 440 may also keep track of the location of assets, content, metadata, etc., and its corresponding state (e.g., active, inactive, etc.). A further description of asset manager 440 is provided below.

Catalog manager 445 may categorize assets received from, for example, content creator 110, based on various catalog rules. Catalog manager 445 may permit a user to view and search assets based on various catalog criteria (e.g., packages, bundles, etc.).

Monitoring and reporting manager 450 may monitor the health of devices, components, etc., of DDC 150. Monitoring and reporting manager 450 may generate alerts, log and send notifications when, for example, transactional timeouts occur, retries fail, or a device, a component, etc., of DDC 150 fails or may be operating in a below-normal state. Monitoring and reporting manager 450 may also generate reports pertaining to content providers or other types of customers. For example, an activity report may include a catalog of customer activity (e.g., by customer orders, etc.) during a particular time period (e.g., month, year, etc.).

Figure 5A:
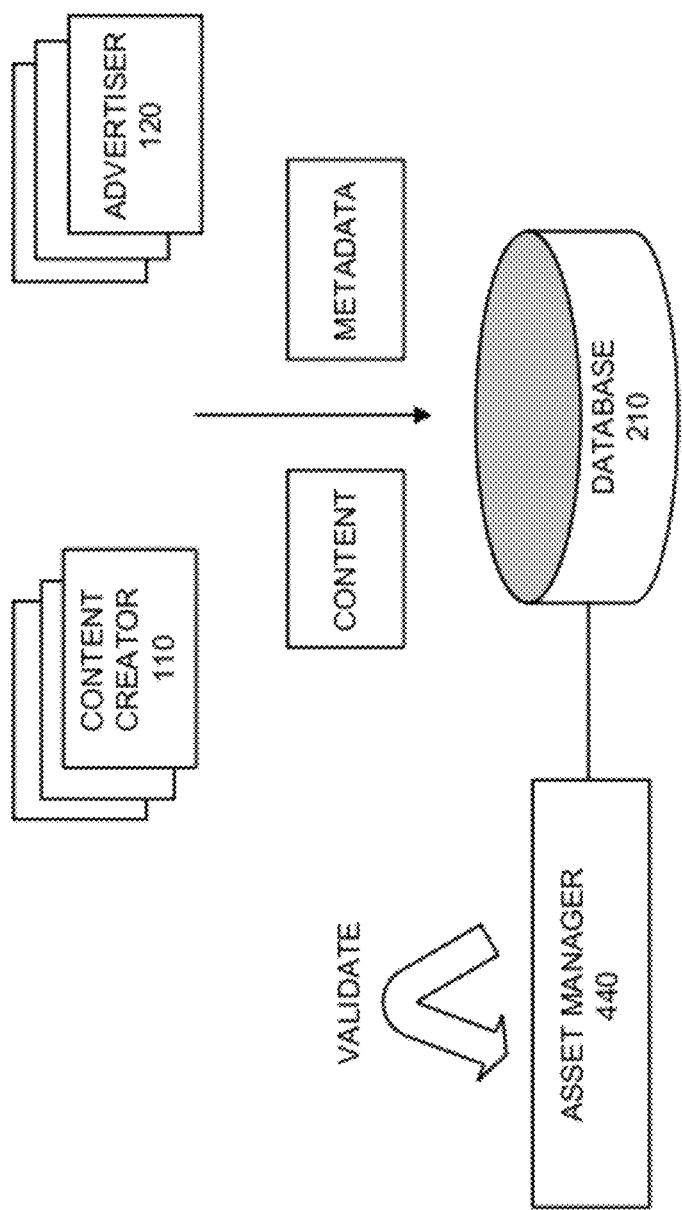
FIGS. 5A-5I are diagrams illustrating exemplary processes performed by an exemplary embodiment of an asset manager.

FIG. 5A is a diagram illustrating an exemplary process associated with asset manager 440. For example, as illustrated, asset manager 440 may ingest content and metadata from content creator 110 or advertiser 120. Asset manager 440 may then store the content and the metadata in database 210 or some other storing medium (e.g., memory/storage 310). During the ingestion process, asset manager 440 may validate the metadata. For example, asset manager 440 may recognize a format of the metadata and determine whether fields and values in the fields are correct. For example, asset manager 440 may inspect and analyze fields and values in view of the format and/or other information (e.g., customer order, etc.). As an example, if a particular field is empty, yet based on the format, the field is supposed to identify, for example, the content provider (e.g., a content creator identifier), asset manager 440 may determine that an error exists. As another example, asset manager 440 may determine that an error exists when a metadata field includes a value, but the value is incorrect (e.g., outside a value range for the metadata field, etc.). The value may correspond to a string (e.g., numerical, alphanumerical, alphabetic, etc.) contained in the metadata field. According to another example, if an element Actor is incorrectly spelled as ActXor, asset manager 440 may determine that an error exists. Depending on the error, asset manager 440 may alert a DDC user, self-correct the error, and/or notify other devices, components, etc., of DDC 150 so that the error may be resolved. For example, the error may be resolved by having the content creator re-send corrected metadata.

Additionally, during the ingestion process, asset manager 440 may keep track of when the content and metadata is received and where the content and the metadata is stored. Depending on the circumstances (e.g., the customer order, etc.), the content and the metadata may be, for example, archived, or transformed and distributed (i.e., with no long-term storage) based on the customer order. Asset manager 440 may also keep track of how the content and the metadata is transformed, where it has been distributed, where it will be distributed, etc.

Figure 5B:
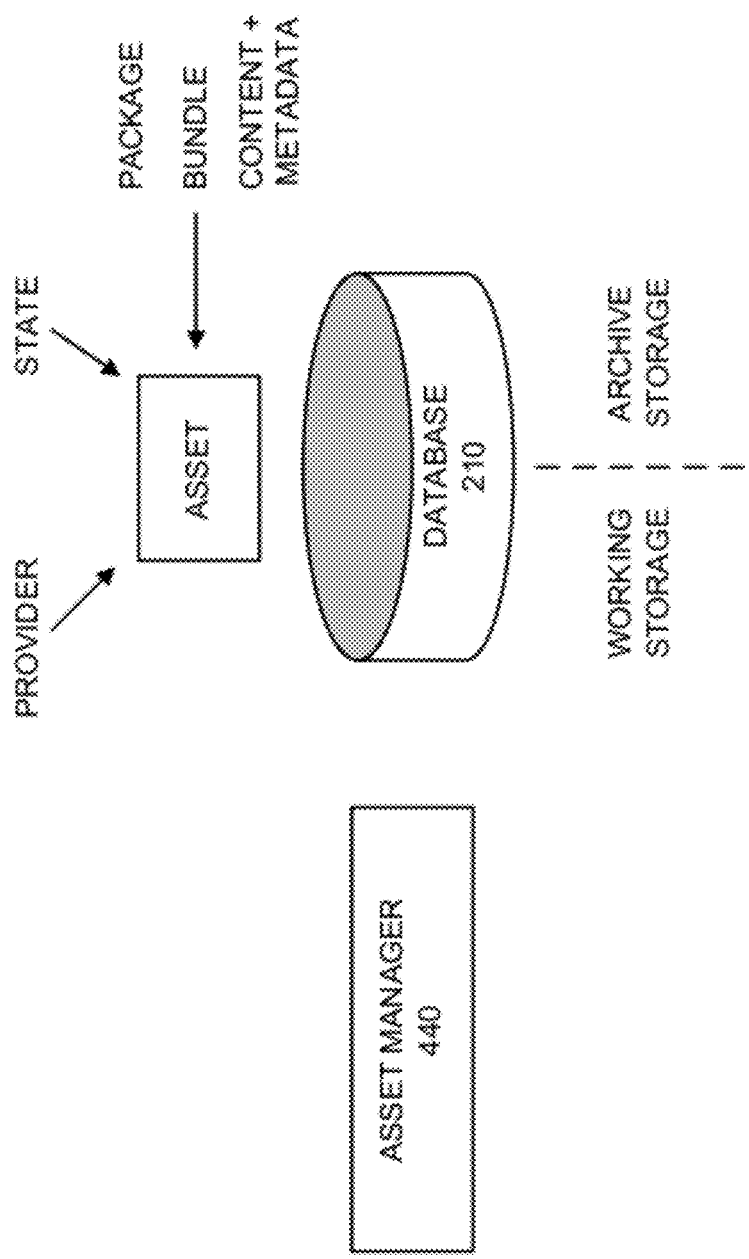

Referring to FIG. 5B, as previously described, asset manager 440 may manage the storage, the use, etc., of content and metadata, packages, bundles, etc. According to an exemplary embodiment, the assets, packages, etc., may include metadata that indicates, among other things, the provider of the asset, package, etc., and a state of the asset, package, etc. For example, a state of an asset may correspond to: successfully ingested, partially ingested, transformed, encrypted, bad asset, purged, active, etc. Asset manager 440 may store assets, packages, etc., in various storage areas (e.g., working storage, archive storage, etc.). Asset manager 440 may optimize the use of content, assets, etc., stored. For example, when a work order needs the same content, package, asset, etc., as another work order, asset manager 440 may provide for the re-use of the content, package, etc. Asset manager 440 may also permit a DDC user to create, update, and get an asset, a package, a bundle, etc.

Figure 5C:
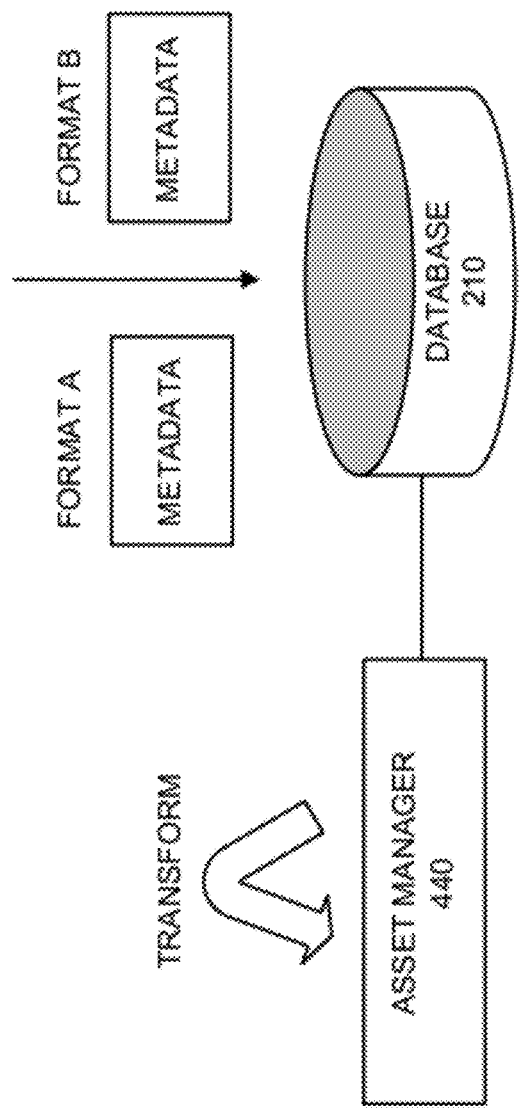

Referring to FIG. 5C, according to an exemplary embodiment, asset manager 440 may transform metadata from one format to another format. According to an exemplary embodiment, asset manager 440 may receive customer orders involving multiple parties or business entities that have adopted different metadata formats. For example, a customer order, received from a content creator 110, may pertain to content and metadata that corresponds to one format (e.g., ADI 2.0), while a DMR 130, which is to receive the content and the metadata after transforming, packaging, and distributing takes place, may use another format (e.g., a proprietary format). Given the conflicting metadata formats, asset manager 440 may transform the metadata from one format to another format, so that the customer order may be fulfilled. For example, in some instances, particular formats may have similar fields, but not identical fields (e.g., an actor field vs. a character field, a Kids movie field vs. a Children's movie field, etc.). In other instances, a particular format may include one or multiple fields that another format does not include (e.g., a cameraman field, a director field, etc.). In yet other instances, particular formats may include the same field, but one format does not include a particular type for that field. For example, both formats may include an asset class field. However, one format may allow for an asset class called "key frame," while the other format does not. A further description of a transformation process, performed by asset manager 440, is described below.

As previously described, asset manager 440 may transform the metadata from one format to another format. For example, asset manager 440 may receive metadata having one format from content creator 110. Asset manager 440 may transform the metadata to another format so that DDC 150 may use the metadata for managing content, etc. According to an exemplary embodiment, asset manager 440 may transform the metadata to an extendible DDC normalized format. In this way, any field of data included in a source metadata (e.g., associated with content creator 110, etc.) may be preserved in the extendible DDC normalized format, associated with DDC 150, when a standard ADI format does not provide for every field included in the source metadata. According to other exemplary embodiments, the extendible DDC normalized format may be based on a metadata format that is different from ADI (e.g., FILM, a proprietary format, a non-standard format, etc.).

Asset manager 440 may also transform the metadata from the extendible DDC normalized format to another format used by, for example, DMR 130. In this way, the extendible DDC normalized format may be used as a bridge from a source metadata format (e.g., associated with content creator 110, etc.) to a target metadata format (e.g., associated with DMR 130, etc.). Depending on the fields provided by the target metadata format, a field from the extendible DDC normalized format may or may not be transformed. For example, if the extendible DDC normalized format includes a lead character field and the target metadata format provides for a lead actor field, asset manager 440 may transform the data for this field. However, if the extendible DDC normalized format includes a cameraman field, which was included in a source metadata format (e.g., from content creator 110), but the target metadata format does not provide for the cameraman field, asset manager 440 may not transform the metadata for this field. In other words, the cameraman metadata may not be included with the target metadata.

The extendible DDC normalized format may provide for fields, values in fields, etc., which may not be provided by the ADI format (e.g., ADI 1.0, ADI 1.1, ADI 2.0, etc.), but may be included with a particular source metadata format (e.g., content creator 110, etc.). In this way, the source metadata may be preserved in the extendible DDC normalized format, regardless of the source metadata format.

Figure 5D:
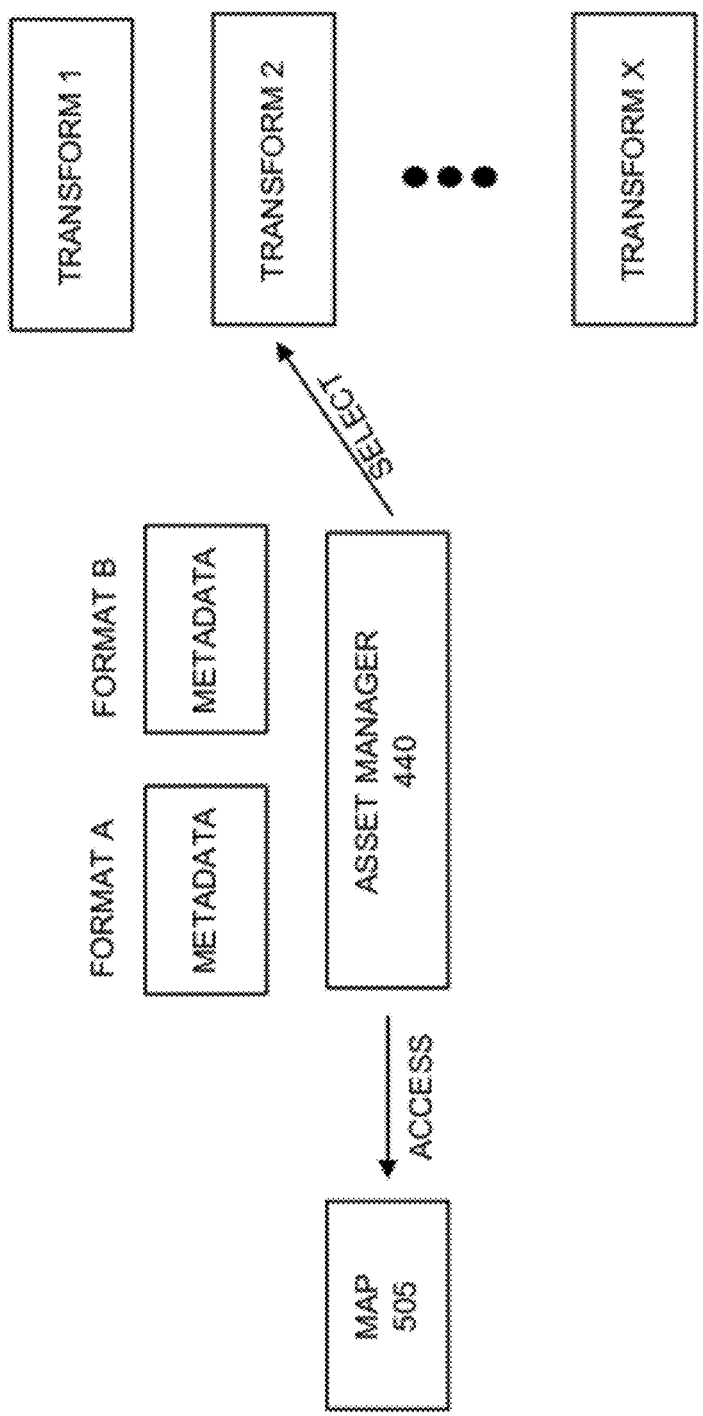
Figure 5E:
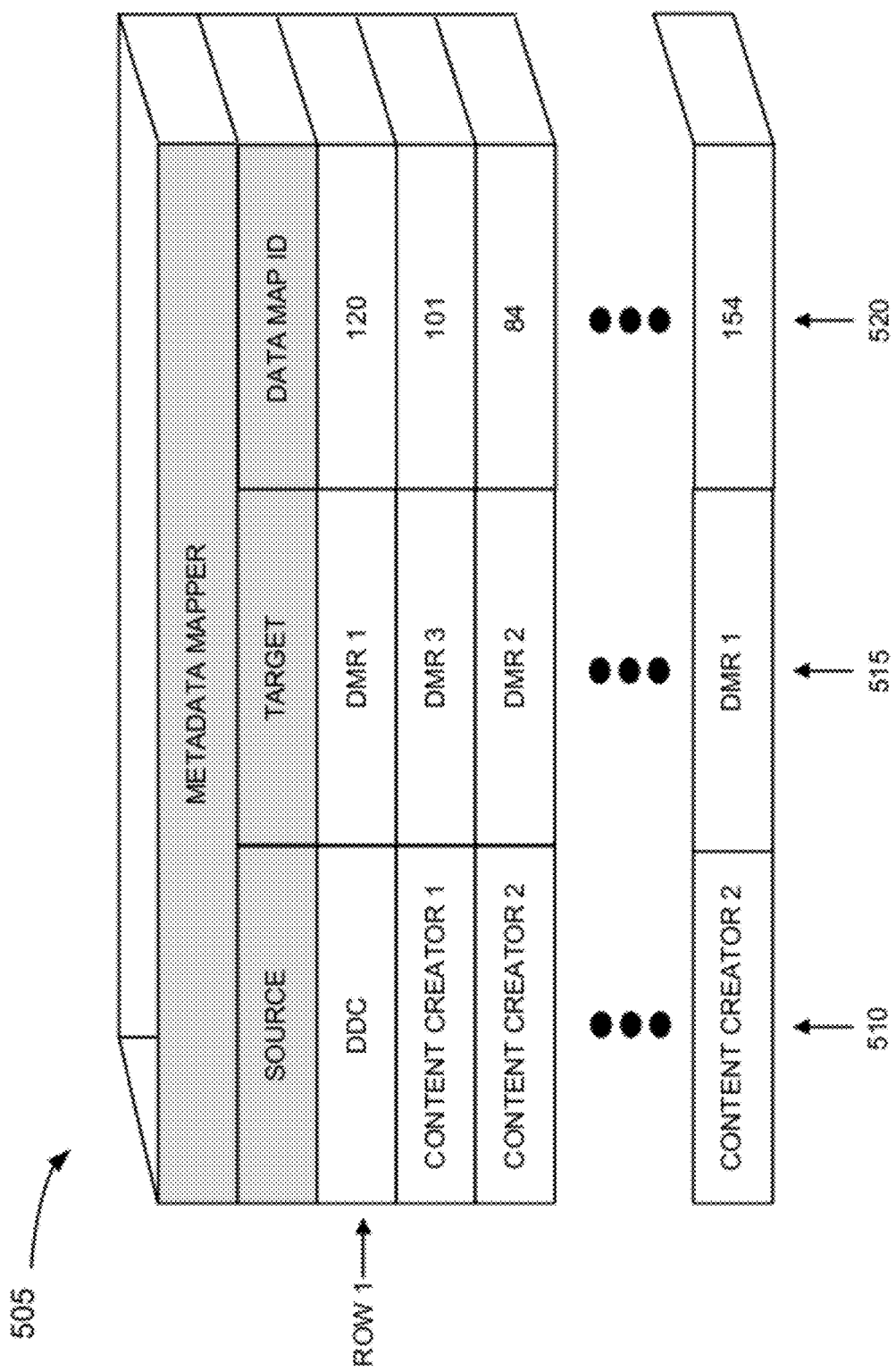

Referring to FIG. 5D, according to exemplary embodiment, during a transformation process, asset manager 440 may access a map 505 or some other data structure (e.g., table, etc.) to identify and select an appropriate transform. For example, as illustrated in FIG. 5E, an exemplary map 505 may include a source field 510, a target field 515, and a data map identifier field 520. Source field 510 may include information that indicates an entity associated with the source metadata. Target field 515 may include information that indicates an entity associated with the target metadata. The data map identifier field 520 may include an identifier, a pointer, or the like, of a data map. According to other embodiments, map 505 may include additional fields or different fields to permit asset manager 440 to use the appropriate transform, perform other appropriates processes, etc., as described herein. For example, map 505 may include field(s) that include information that indicates the format of the metadata (e.g., a source metadata field, a target metadata field), the file format (e.g., Extensible Markup Language (XML), etc.) of the metadata (e.g., a source file type field, a target file type field), the type of asset (e.g., movie, image, etc.), etc. According to an exemplary embodiment, asset manager 440 may identify information corresponding to one or more fields of map 505 based on a work unit that is being executed. For example, the work unit may include information that indentifies a particular content creator 110, a particular DMR 130, etc.

According to an exemplary embodiment, the data map may include information on which fields, values, etc., of the source metadata are to be transformed and how such fields, values, etc., are to be transformed. Additionally, the data map may include information as to file format. For example, the source metadata may be in one file format (e.g., XML, etc.) and the target metadata may need to be in another file format (e.g., Microsoft Excel file format (XLS), Hypertext Markup Language (HTML), etc.). In instances when the source metadata and the target metadata have different file formats, asset manager 440 may also perform a translation process.

The data map may be initially created by a DDC user based on the particular metadata formats involved. For example, a content creator 110 may provide the DDC user with the metadata specifications and requirements pertaining to their metadata format. Similarly, a DMR 130 may provide the DDC user with the metadata specifications and requirements pertaining to their metadata format. The DDC user may then create the data map that may be used by asset manager 440 to validate, transform, translate, etc., metadata. Unlike conventional approaches, in which transformation, etc., of metadata may be manually performed by a person, asset manager 440 may perform these processes in an automated manner. Content creators 110, DMRs 130, etc., may adhere to a particular metadata format so that validation, transformation, etc., may be automatically performed based on the data map.

As an example for the above, with reference to row 1, the source entity may be associated with DDC 150 (e.g., an extendible DDC normalized format) and the target entity may be associated with a DMR 1 (e.g., a FILM metadata format). Asset manager 440 may select the data map identifier (e.g., "120") of data map identifier field 520 to access and use the appropriate data map so that the transform of the extendible DDC normalized format to the FILM format may take place. For example, as illustrated in FIG. 5D, asset manager 440 may select the appropriate transform (e.g., corresponding to data map identifier 120, in this example) to perform one or more of validation, transformation, or translation. Asset manager 440 may select the appropriate data map based on the data map identifier, which may be used by the appropriate transform.

Figure 5F:
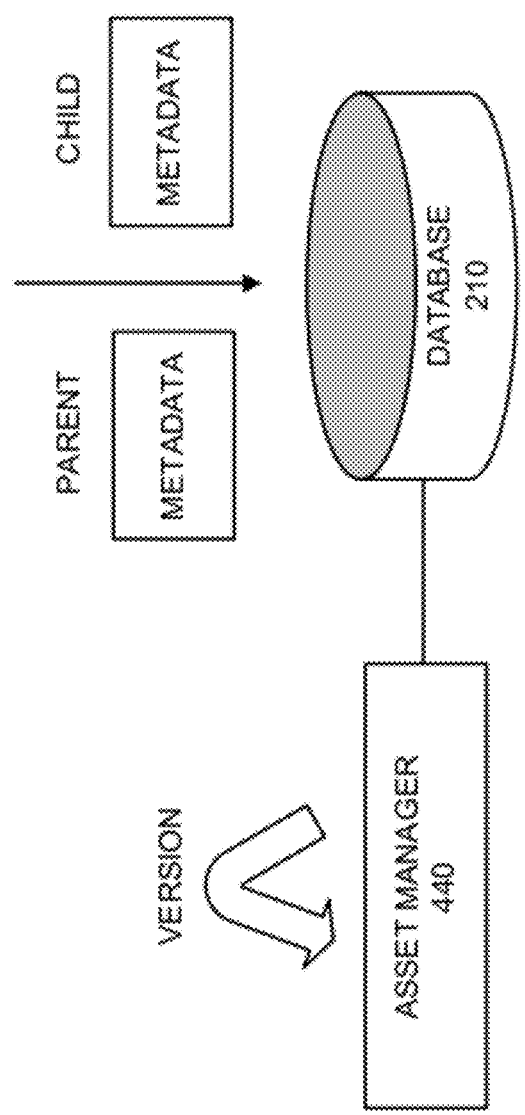

Referring to FIG. 5F, according to an exemplary embodiment, asset manager 440 may keep track of the versions of the metadata that result from the transformation of the metadata. For example, as illustrated, when metadata is received from a source (e.g., content creator 110), asset manager 440 may recognize the metadata as a parent version or a root version of the metadata. Once the metadata is transformed, asset manager 440 may recognize the transformed metadata as a child version or a leaf version of the metadata. The transformed metadata may also be recognized as a parent version, if for example, asset manager 440 transforms the already transformed metadata to another transformed version of the metadata. In this way, asset manager 440 may back-trace to any version of the metadata. Additionally, according to an exemplary embodiment, asset manager 440 may maintain associations between content. For example, if the original content is of a high-definition or standard definition, but a low-resolution version of the content is created, asset manager 440 may maintain an association between the original content and the low-resolution content.

Figure 5G:
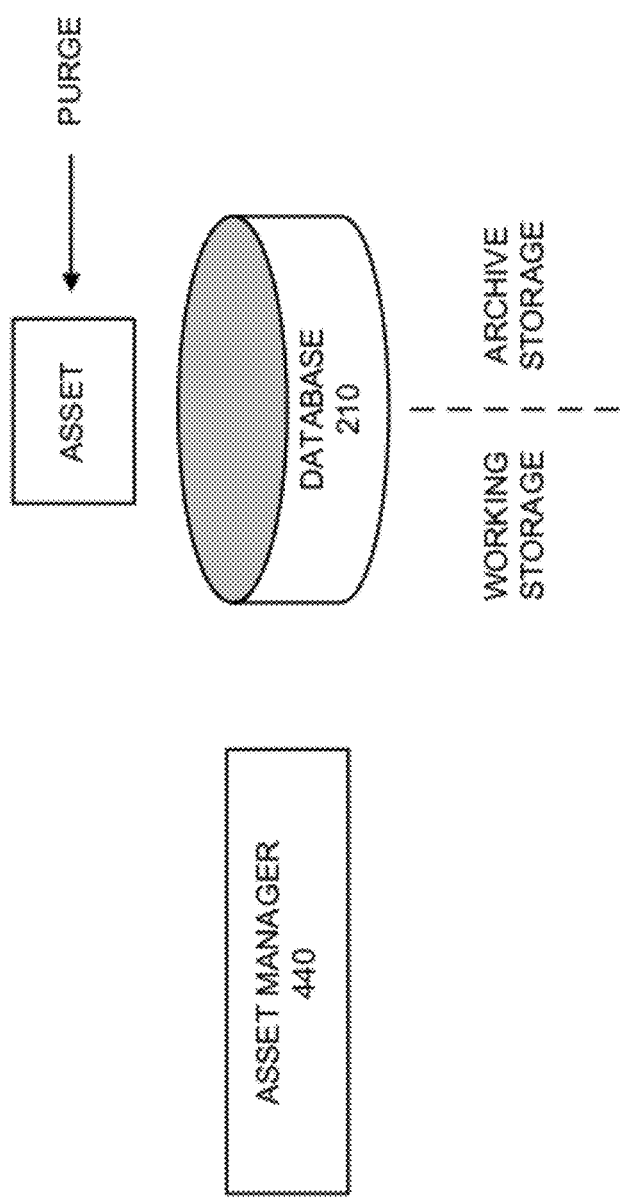

Referring to FIG. 5G, according to an exemplary embodiment, asset manager 440 may automatically purge content, metadata, packages, and bundles. For example, content, metadata, packages, and bundles may be stored in archiving storage area (e.g., in database 210 or some other storing medium (e.g., memory/storage 310)). Asset manager 440 may purge the content, etc., based on various parameters (e.g., time), a customer request, a work order, a customer account policy, etc.

Figure 5H:
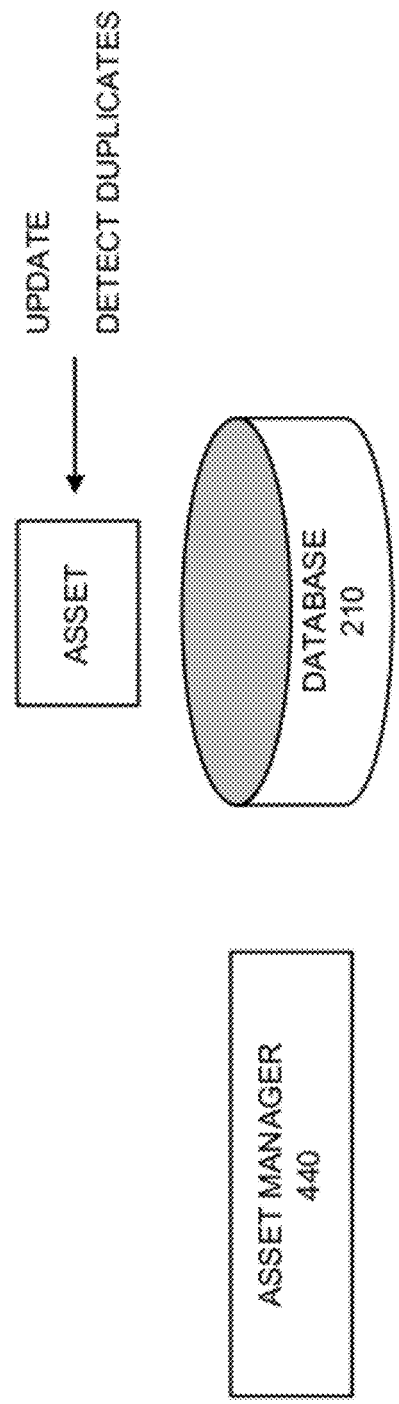

Referring to FIG. 5H, according to an exemplary embodiment, asset manager 440 may provide for the updating of content, metadata, assets, packages, and bundles. Additionally, according to an exemplary embodiment, asset manager 440 may provide for the automatic detection of duplicate assets, duplicate packages, duplicate bundles, etc. For example, asset manager 440 may detect a duplicate asset, etc., based on file name, file size, and file checksum. Once detected, asset manager 440 may, for example, store the detected duplicate in a duplicate storage area and, alert a DDC user and/or automatically purge the duplicate asset. Alternatively, a duplicate asset may be useful when a problem or error exists with an asset currently being processed. For example, the duplicate asset may be retrieved and used in place of a bad asset.

Figure 5I:
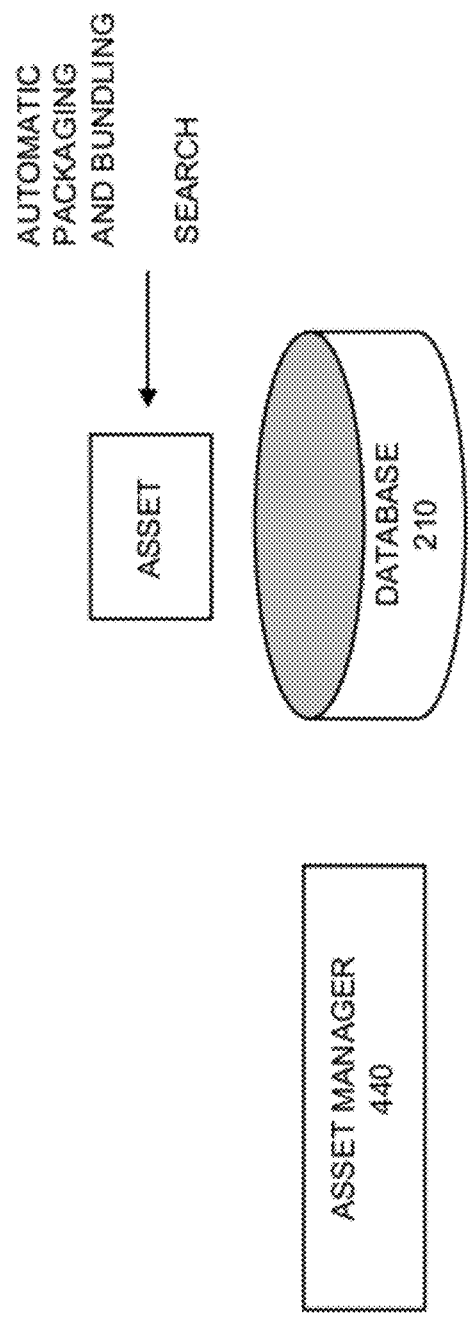

Referring to FIG. 5I, according to an exemplary embodiment, asset manager 440 may provide for the automatic creation of packages and bundles. For example, asset manager 440 may create a package or a bundle based on packaging rules or bundling rules, which may be defined by a DDC user, content creator 110, DMR 130, etc. Asset manager 440 may allow a DDC user to configure and manage the packaging rules and the bundling rules. Alternatively, according to an exemplary embodiment, asset manager 440 may permit the DDC user to create packages or bundles. Additionally, according to an exemplary embodiment, asset manager 440 may provide for the searching of content, assets, packages, and bundles. For example, content, assets, packages, and/or bundles may be searched based on one or multiple metadata fields (e.g., provider name, provider identifier, type of content, title of content, etc.).

Figure 6A:
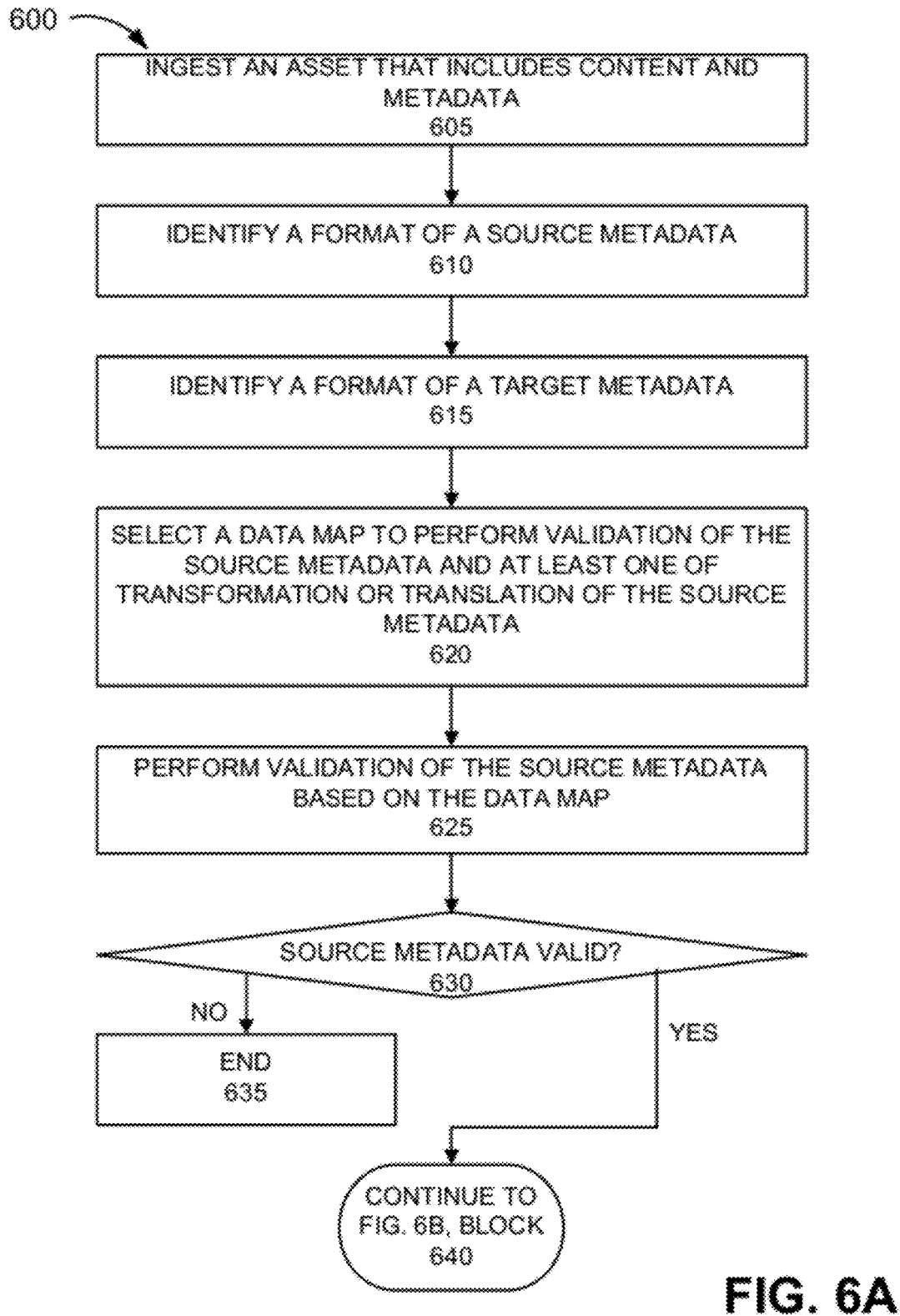
FIGS. 6A and 6B are a flow diagram illustrating an exemplary process for managing metadata.
Figure 6B:
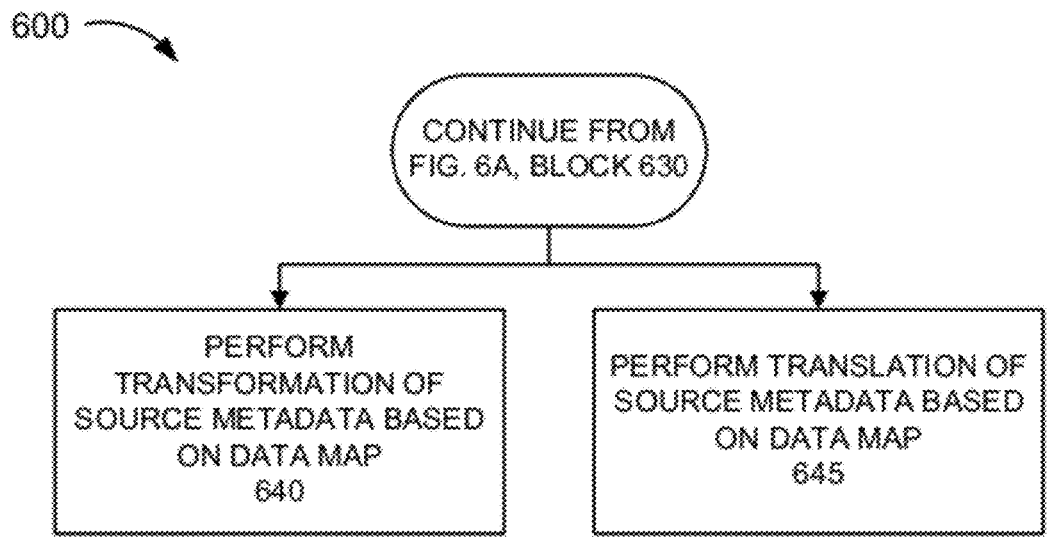

FIGS. 6A and 6B illustrate a flow diagram of an exemplary process 600 for managing metadata. According to an exemplary embodiment, one or more operations of process 600 may be performed by asset manager 440. Process 600 may be performed in an automated manner.

Process 600 may include ingesting an asset that includes content and metadata (block 605). For example, as previously described, DDC 150 may receive an asset from various source entities (e.g., content creator 110, etc.).

A format of a source metadata may be identified (block 610) and a format of a target metadata may be identified (block 615). For example, as previously described, according to an exemplary embodiment, asset manager 440 may identify a source metadata format and a target metadata format based on a work unit that indicates a source entity (e.g., content creator 110, etc.) and a target entity (e.g., DMR 130, DDC 150, etc.). According to other embodiments, as previously described, asset manager 440 may identify the source and target metadata formats based on other types of information.

A data map to perform validation of the source metadata and at least one of transformation or translation of the source metadata may be selected (block 620). For example, as previously described, asset manager 440 may select the appropriate data map based on the identifying described above. As an example, map 505 may include a data map identifier. The data map identifier may be used as a pointer or reference to the appropriate data map.

A validation of the source metadata based on the data map may be performed (block 625). For example, as previously described, asset manager 440 may validate the ingested metadata for errors, missing values, misspellings, etc. It may be determined whether the source metadata is valid (block 630). For example, asset manager 440 may determine whether the source metadata is valid during a validation process. In some cases, asset manager 440 may determine that the source metadata is valid (block 630—YES) when no errors, etc., exist, or asset manager 440 is able to auto-correct an error, etc. Referring to FIG. 6B, in these cases, process 600 may continue to blocks 640 and/or 645 to perform transformation and/or translation of the source metadata based on the data map. For example, the source metadata may be converted to the format and/or file type of the target metadata format. As an example, if the source metadata format is ADI version 1.1 and the target metadata format is ADI version 1.1 extendible, the source metadata may not need to be transformed. However, the source metadata may be stored as a different file type than files based on the target metadata format. In this instance, the source metadata may be translated, but not transformed. In other examples, the source metadata may be of a different format in which transformation may be performed, etc.

In other cases, asset manager 440 may determine that the source metadata is not valid (block 630—NO). For example, asset manager 440 may determine that an error, etc., needs correcting. As previously described, asset manager 440 may notify a DDC user, notify other components of DDC 150, notify content creator 110, etc., so that the error, etc., may be corrected or resolved (block 635).

Although FIGS. 6A and 6B illustrate exemplary operations for transforming metadata, according to other exemplary embodiments, process 600 may include additional operations, fewer operations, and/or different operations than those illustrated and described. For example, asset manager 440 may not validate the metadata when asset manager 440 is to transform and/or translate metadata in the format of DDC 150 to a format associated with a DMR 130.

In the foregoing description, asset manager 440 may manage assets, metadata, etc. Asset manager 440 may provide, among other things, an automated process for validation, transformation, and translation of metadata, maintain relationships and associations between assets, etc., automatically purge assets, etc., automatically detect duplicate assets, etc., as well as other processes described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

While a series of blocks have been described with regard to exemplary process illustrated in FIGS. 6A and 6B, the order of the blocks may be modified according to other embodiments. In addition, non-dependent blocks may be performed parallel. Furthermore, other processes described in this description may be modified and/or non-dependent operations may be performed in parallel.

The exemplary embodiments described herein may be implemented in many different forms of software, firmware, and/or hardware. For example, a process or a function may be implemented as "logic" or as a "component." This logic or this component may include hardware (e.g., processing system 305, etc.), a combination of hardware and software (e.g., application 315), a combination of hardware and firmware, or a combination of hardware, firmware, and software. The embodiments have been described without reference to a specific software code, a specific hardware or circuit configuration, etc., since the logic or the component can be designed to implement the embodiments based on the description herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the specification and/or drawings should be construed as critical or essential to the exemplary embodiments described herein unless explicitly described as such.

What is claimed is:

1. A method comprising:
   automatically receiving an asset including content and metadata;
   automatically identifying a source metadata format of the metadata;
   automatically identifying a target metadata format;
   automatically selecting a data map to perform validation of the metadata and at least one of transforming or translating of the metadata based on the identifying of the source metadata format and the identifying of the target metadata format, wherein the transforming includes converting the metadata to the target metadata format and the translating includes converting a file type of the metadata to a target metadata file type;
   automatically attempting to validate the metadata based on the data map;
   automatically performing the at least one of the transforming or the translating of a validated metadata when the metadata is validated based on the data map, wherein the transforming includes converting the validated metadata to the target metadata format, wherein the target metadata format includes one or more extendible fields and values that correspond to one or more fields and values included in a source metadata format of the metadata and not provided by a standard of a metadata format on which the target metadata format is based and the target metadata format includes each of the fields and values provided by the standard of the metadata format on which the target metadata format is based, and wherein the transforming includes using the one or more extendible fields when one or more fields of the validated metadata do not have corresponding one or more fields afforded by the standard of the metadata format; and
   automatically storing a target metadata based on the performing.

2. The method of claim 1, wherein the target metadata format includes each of the fields and values provided by an Asset Distribution Interface (ADI)-standard metadata format.

3. The method of claim 1, further comprising:
   automatically identifying the target metadata format associated with the target metadata;
   automatically identifying another target metadata format;
   automatically selecting another data map to perform at least one of transforming or translating of the target metadata;
   automatically performing at least one of transforming or translating of the target metadata based on the other data map, wherein the transforming includes converting the target metadata to the other target metadata format, and the translating includes converting a file type of the target metadata to another target metadata file type; and
   automatically storing another target metadata based on the performing of the at least one of the transforming or the translating of the target metadata.

4. The method of claim 3, wherein when automatically performing the transforming of the target metadata, one or more metadata fields included in the target metadata format, but not included in the other target metadata format, are not transformed.

5. The method of claim 1, further comprising:
   automatically maintaining first relationship information between the metadata and the target metadata, wherein the first relationship information indicates that the metadata is a parent and the target metadata is a child;
   transforming the target metadata to another target metadata; and
   automatically maintaining second relationship information between the target metadata and the other target metadata, wherein the second relationship information indicates that the target metadata is a parent and root version and the other target metadata is a child and leaf version.

6. The method of claim 1, further comprising:
   automatically detecting duplicate assets based on a file name, a file size, and a file checksum; and
   automatically purging a duplicate asset based on the detecting.

7. The method of claim 1, wherein the automatically attempting to validate the metadata comprises:
   automatically inspecting and analyzing the metadata for errors including an empty metadata field, an incorrect value in a metadata field, and a misspelling.

8. The method of claim 1, wherein the automatically identifying the source metadata format comprises:
   receiving a work unit that includes information indicating a particular asset provider from which the asset is received, and wherein the automatically selecting comprises:
   automatically selecting a data map identifier based on the particular asset provider, wherein the data map identifier references the data map.

9. A device, comprising:
   a memory to store instructions; and
   a processor to execute the instructions to:
   automatically process an asset including content and metadata;

automatically select a data map to perform transforming of the metadata, wherein the transforming includes converting the metadata to a target metadata format;

automatically perform the transforming of a validated metadata based on the data map, wherein the transforming includes converting the metadata to the target metadata format, and wherein the target metadata format includes one or more extendible fields and values that correspond to one or more fields and values included in a source metadata format of the metadata and not provided by a standard of a metadata format on which the target metadata format is based and the target metadata format includes each of the fields and values provided by the standard of the metadata format on which the target metadata format is based, and wherein the transforming includes using the one or more extendible fields when one or more fields of the validated metadata do not have corresponding one or more fields afforded by the standard of the metadata format; and automatically store a target metadata based on the automatically performing.

10. The device of claim 9, wherein the processor to execute the instructions to:

automatically validate the metadata; and automatically notify a user if the metadata cannot be validated.

11. The device of claim 10, wherein, when validating the processor to execute the instructions to:

automatically inspect and analyze the metadata, prior to selecting the data map, for an empty metadata field, an incorrect value in a metadata field, and a misspelling; and automatically recognize whether an error exists based on an inspection and analysis of the metadata and a standard of a metadata format pertaining to the metadata.

12. The device of claim 9, wherein the target metadata format includes each of the fields and values provided by an Asset Distribution Interface (ADI)-standard metadata format.

13. The device of claim 9, wherein the processor to execute the instructions to:

automatically maintain relationship information between the metadata and the target metadata; and automatically maintain associations between assets;

transform the target metadata to another target metadata; and automatically maintain second relationship information between the target metadata and the other target metadata, wherein the second relationship information indicates that the target metadata is a parent and the other target metadata is a child of the parent.

14. The device of claim 9, wherein the processor to execute the instructions to:

automatically detect duplicate assets based on a file name, a file size, and a file checksum; and automatically purge a duplicate asset based on a detection of the duplicate assets.

15. The device of claim 9, wherein the processor to execute the instructions to:

automatically create a package or a bundle based on packaging rules or bundling rules, wherein the package includes a group of assets and the bundle includes a group of packages.

16. A non-transitory storage medium storing executable instructions executable by at least one processing system, the instructions including instructions to:

automatically receive metadata from an asset provider;

automatically identify the asset provider of the metadata;

automatically perform transforming of the metadata based on an identification of the asset provider, wherein the transforming includes converting the metadata to a target metadata format, wherein the target metadata format includes one or more extendible fields and values that correspond to one or more fields and values included in a source metadata format of the metadata and not provided by a standard of a metadata format on which the target metadata format is based and the target metadata format includes each of the fields and values afforded by the standard of the metadata format on which the target metadata format is based, and wherein the transforming includes using the one or more extendible fields when one or more fields of the metadata do not have corresponding one or more fields afforded by the standard of the metadata format, and wherein the standard of the metadata format on which the target metadata format is based is different from a standard of the source metadata format on which the source metadata format is based; and automatically store a target metadata based on a performance of the transforming.

17. The non-transitory storage medium of claim 16, wherein the instructions include instructions to:

automatically create a package or a bundle based on packaging rules or bundling rules, wherein the package includes a group of assets and the bundle includes a group of packages.

18. The non-transitory storage medium of claim 16, wherein the instructions include instructions to:

automatically maintain relationship information between the metadata and the target metadata.

19. The non-transitory storage medium of claim 16, wherein the instructions include instructions to:

automatically validate the metadata, wherein a validation of the metadata includes detecting whether one or more errors exist in the metadata to be transformed; and automatically notify a user if the metadata includes one or more errors.

20. The non-transitory storage medium of claim 16, wherein the target metadata format includes each of the fields and values provided by an Asset Distribution Interface (ADI)-standard metadata format.

* * * * *